Nov. 16, 1926.

F. F. BUMSTEAD 1,607,236

MOTOR VEHICLE

Filed Dec. 18, 1922

Inventor
F. F. Bumstead,
By C. A. Snow & Co.
Attorneys

Nov. 16, 1926.  
F. F. BUMSTEAD  
1,607,236  
MOTOR VEHICLE  
Filed Dec. 18, 1922  
3 Sheets-Sheet 3

Inventor  
F. F. Bumstead,  
By C. A. Snow & Co.  
Attorneys

Patented Nov. 16, 1926.

1,607,236

UNITED STATES PATENT OFFICE.

FRANK F. BUMSTEAD, OF LONG BEACH, CALIFORNIA.

MOTOR VEHICLE.

Application filed December 18, 1922. Serial No. 607,666.

This invention relates to motor vehicles of the three-wheeled type.

The object of the invention is to provide a vehicle of this character which will have the appearance and ride like an automobile and yet resemble a motorcycle in many ways.

Another object is to provide a three wheeled car having a flat bed frame with a long wheel base and with seats arranged crosswise of the car.

Another object is to construct such a vehicle so that a rolling motion will be imparted to the car in crossing gutters and the like, instead of a vertical motion.

Another object is to provide improved means for mounting the wheels of the vehicle whereby all shocks will be absorbed.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
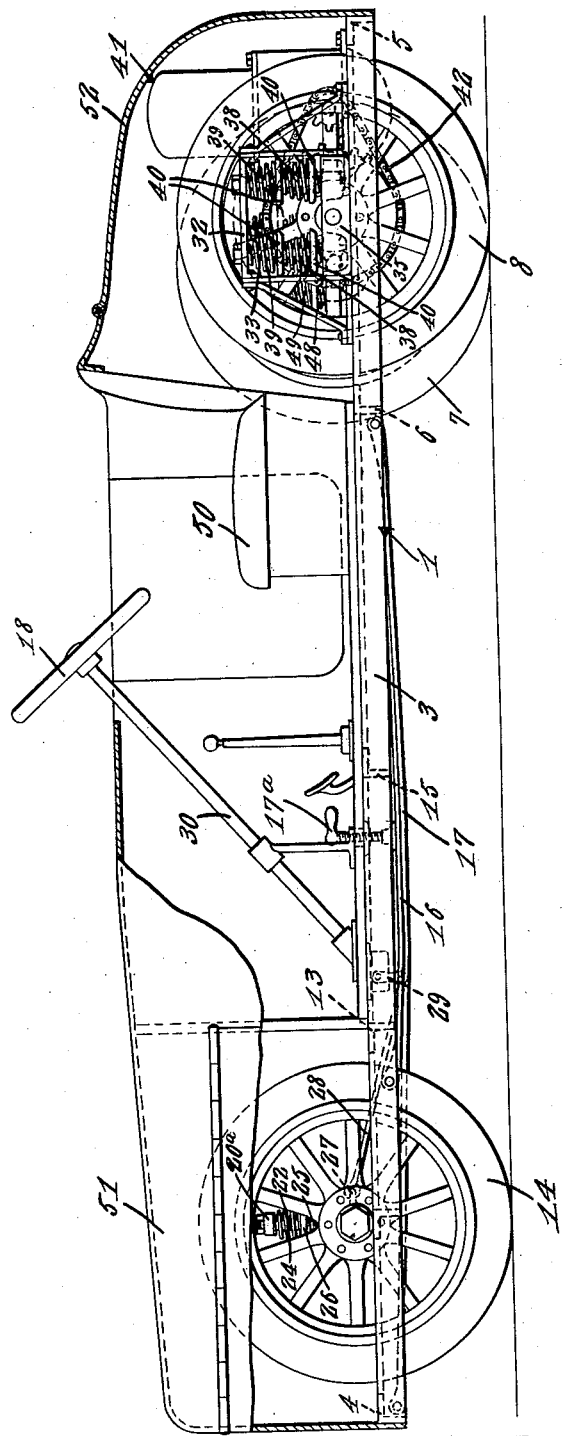
Figure 1 represents a side elevation of a vehicle constructed in accordance with this invention with the cover member or hood shown broken out and in section.
Figure 2:
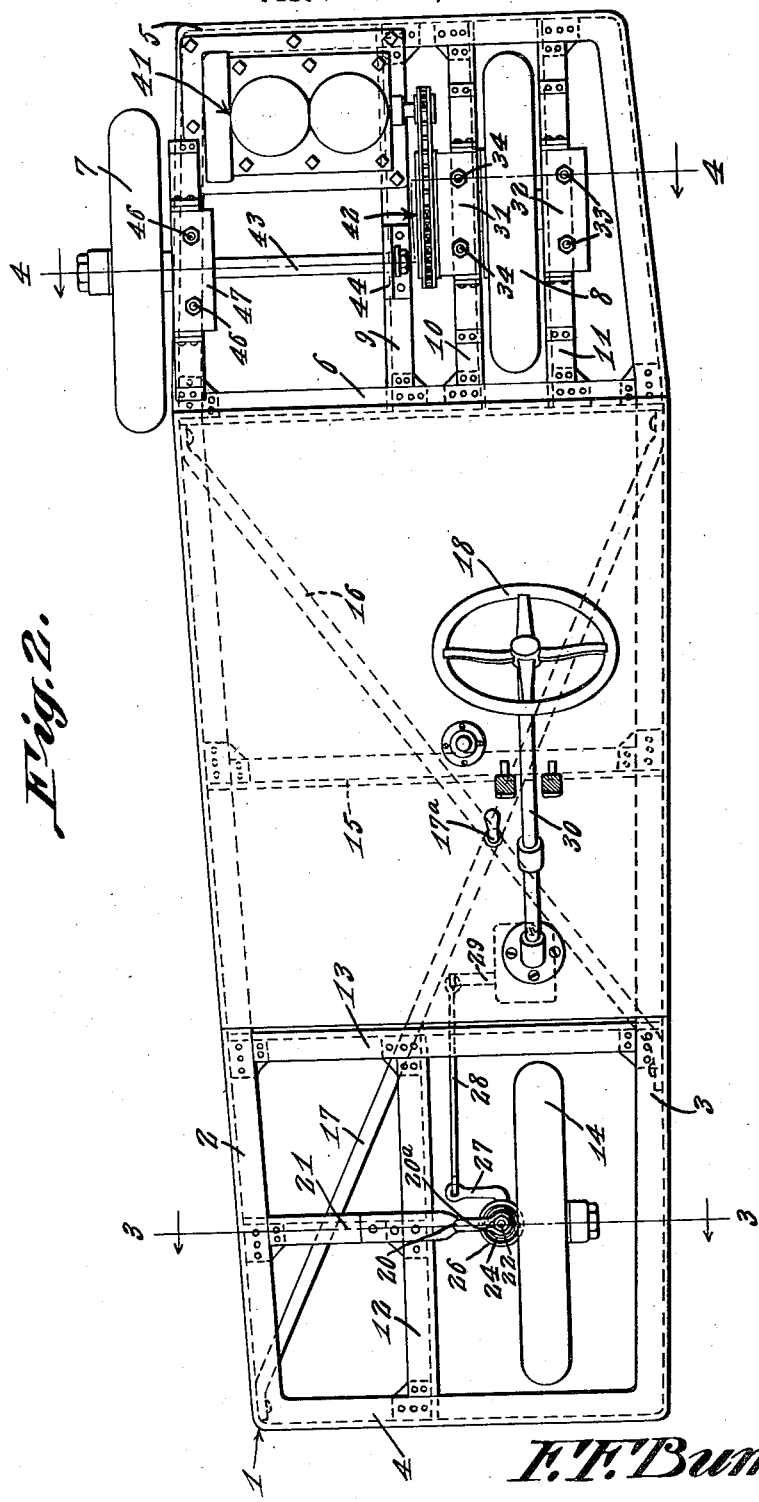
Fig. 2 is a top plan view thereof with the cover removed.

In the embodiment illustrated, a substantially rectangular flat bed frame 1 is shown preferably composed of angle iron and comprising side bars 2 and 3, which converge at their rear portions and are connected at their front ends by a cross bar 4 and at their rear ends by a cross bar 5.

Another cross bar 6 connects the side bars at a point spaced inwardly from the cross bar 5 and in advance of the rear wheels 7 and 8. A plurality of transversely spaced longitudinally extending bars 9, 10 and 11 connect the cross bars 5 and 6 and are designed as supports for the bearings of the wheels 7 and 8 as will be hereinafter more fully described.

Another longitudinally extending bar 12 connects the front cross bar 4 with a transverse bar 13 and which strengthens the frame and forms a support for the bearing of the front wheel which wheel is numbered 14.

Another cross bar 15 connects the side bars 2 and 3 between the cross bars 6 and 13, being preferably spaced equi-distant from said bars.

The frame 1 is suitably braced by diagonally disposed bars 16 and 17, the bar 16 being shorter than the bar 17 and extends from the junction of the side bar 2 with the cross bar 6 to a point in advance of the cross bar 13 where it is riveted or bolted to the side bar 3. The member 17 extends from a point adjacent the side bar 3 and intersects the bar 16 extending to a point at the right hand corner of the frame where the side bar 2 joins the cross bar 4.

The front wheel 14 and the rear driving wheel 8 are arranged in tandem within the frame 1 to the left side of the center line thereof while the wheel 7. which may be termed the steady wheel, is located on the right side outside frame 1 and a little forward and parallel with the driving wheel 8. This arrangement of wheels produces a three wheeled vehicle of long wheel base.

Figure 3:
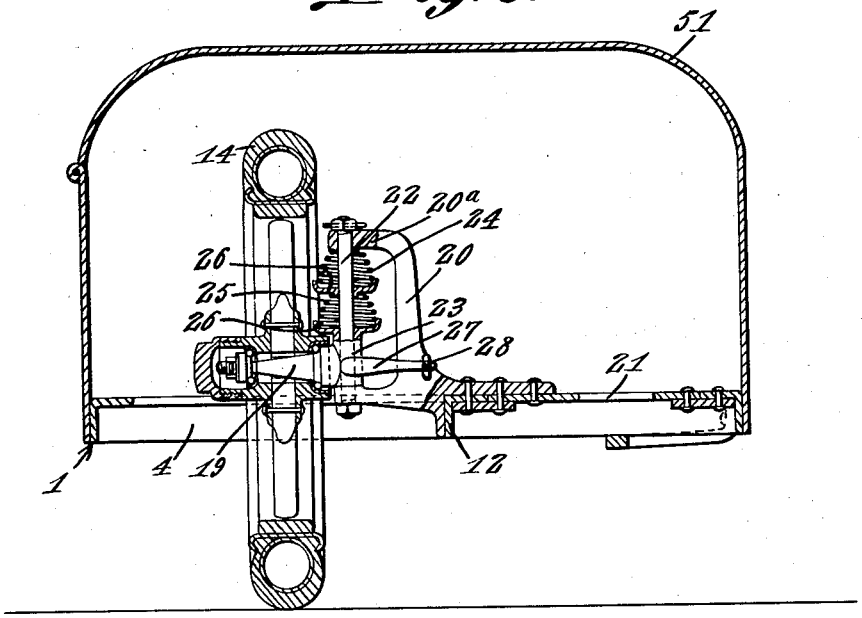
Fig. 3 is a transverse section taken on the line 3—3 of Fig. 2.

A steering wheel 18 is located at the left side of the frame 1 and is suitably connected with the front wheel 14 for steering the vehicle. This front steering wheel 14 is mounted on a spindle 19 in the usual manner to swing from side to side for steering the vehicle. The mounting of this spindle 19 constitutes a part of the invention and as shown, in Fig. 3 a bracket 20 is carried by the frame 1 on a cross bar 21 which connects the side bar 2 with the bar 12. A shaft 22 is mounted in the bracket 20 and carries a sleeve 23 from which projects the spindle 19.

Mounted on the shaft 22 between the sleeve 23 and the upper arm 20$^a$ of the bracket 20 are two cone-shaped coiled springs 24 and 25 which are designed to absorb the shocks incident to obstacles over which the wheel 8 passes. These springs are shown mounted in cup-like supports 26.

The spindle 19 has an arm 27 extending laterally therefrom which is connected by a rod 28 and a link 29 with the steering post 30.

Figure 4:
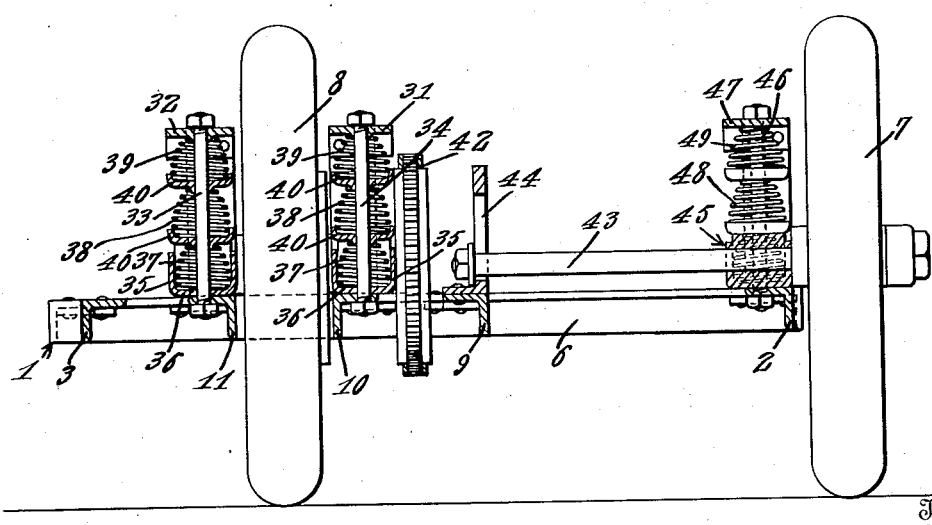
Fig. 4 is a similar view taken on the line 4—4 of Fig. 2.

Brackets or frames 31 and 32 are mounted on the bars 10 and 11 and upright pairs of shafts 33 and 34 are mounted in these frames and on the bars 10 and 11 as shown clearly in Fig. 4.

Bearings 35 for the wheel 8 are mounted on the shafts 33 and 34 for vertical movement and as shown, these bearings have cup-shaped spring seats 36 in which are mounted spirally coiled springs 37 through which the shafts 33 and 34 pass. On these shafts having said springs, are located other coiled springs 38 and 39 which are supported on seats as 40, slidably mounted on the shafts, and are designed to absorb all shocks which are carried to the wheel 8 incident to its passage over rough surfaces.

From the above it will be obvious that two series of superposed coiled springs are arranged on each side of the wheel 8 to support the bearings therefor.

This driving wheel 8 is driven from an engine 41, a sprocket and chain driving mechanism 42 being here shown connecting the wheel with the engine.

The wheel 7 which is termed the steadying wheel is located outside the frame 1 at the right hand side thereof at a point slightly in advance of the location of the driving wheel 8. This wheel 7 is mounted on an axle 43 which extends transversely of the main frame 1 and has its inner end mounted for vertical movement in a slotted bracket 44 which rises from the bar 9. This axle 43 is journalled in a bearing 45 which is mounted for vertical movement on upright shafts as 46 mounted in a frame 47 supported on the side bars 2 and between which and the bearing are mounted coiled springs 48 and 49 which operate in the same manner as the springs which cushion the bearing of wheel 8. The setting forward of the drive wheel gives the car a rolling motion in crossing gutters instead of the vertical motion which is produced when these wheels are set directly opposite each other.

The body portion of the car is shown located in front of the driving wheel and in rear of the front wheel 14, being equipped with crosswise arranged seats as 50. This body houses the steering mechanism, the operating levers, the engine and all parts of the machinery and protects them against the weather. This body includes hinged hood members 51 and 52 which provide for access to the mechanism of the car when it is necessary for adjustments or repairs to be made.

From the above description it will be obvious that a vehicle constructed as herein shown and described will have all of the advantages of a motorcycle and yet present the appearance of an automobile.

At the point where the two cross braces 16 and 17 cross in the middle of the main frame, is a screw 17$^a$ which operates to force down these braces from the main frame so as to fully stiffen the frame. In this frame, these braces form two inverted trusses which stiffen particularly the left side of the main frame.

I claim:—

In a three-wheeled motor vehicle, a frame, an axle mounted at the rear of the frame, a driving wheel mounted on the axle, a steering wheel mounted at the forward end of the frame, and in line with the driving wheel to track with the driving wheel, an axle adjacent to the driving wheel and mounted on the frame in advance of the first mentioned axle, a wheel on the last mentioned axle, and means for operating the steering wheel.

In testimony that I claim the foregoing as my own, I have hereto affixed my signature.

FRANK F. BUMSTEAD.